(12) United States Patent
Olsson et al.

(10) Patent No.: US 7,178,662 B2
(45) Date of Patent: Feb. 20, 2007

(54) CONVEYOR BELT

(75) Inventors: Lennart Olsson, Nyhamnsläge (SE); Jonny Malmberg, Helsingborg (SE)

(73) Assignee: Frigoscandia AB, Helsingborg (SE)

( * ) Notice: Subject to any disclaimer, the term of this patent is extended or adjusted under 35 U.S.C. 154(b) by 0 days.

(21) Appl. No.: 10/520,670

(22) PCT Filed: Jun. 25, 2003

(86) PCT No.: PCT/SE03/01094

§ 371 (c)(1),
(2), (4) Date: Sep. 12, 2005

(87) PCT Pub. No.: WO2004/005167

PCT Pub. Date: Jan. 15, 2004

(65) Prior Publication Data

US 2006/0131139 A1 Jun. 22, 2006

(30) Foreign Application Priority Data

Jul. 8, 2002 (SE) .................................... 0202117

(51) Int. Cl.
*B65G 13/02* (2006.01)
(52) U.S. Cl. ...................................... 198/778; 198/848

(58) Field of Classification Search ................ 198/778, 198/848, 853
See application file for complete search history.

(56) References Cited

U.S. PATENT DOCUMENTS

| 4,932,925 | A | * | 6/1990 | Roinestad et al. | 198/778 |
| 5,141,102 | A | * | 8/1992 | Roinestad et al. | 198/778 |
| 5,501,319 | A | * | 3/1996 | Larson et al. | 198/778 |
| 5,934,448 | A | * | 8/1999 | Kucharski et al. | 198/778 |
| 6,029,797 | A | * | 2/2000 | Olsson | 198/778 |
| 6,237,750 | B1 | * | 5/2001 | Damkjaer et al. | 198/778 |

* cited by examiner

*Primary Examiner*—James R. Bidwell
(74) *Attorney, Agent, or Firm*—Christensen O'Connor Johnson Kindness pllc (57) ABSTRACT

An endless conveyor belt for an air conditioning plant, in which the conveyor belt extends helically along part of its length, comprising transverse rods (4) and lateral elements (3). The conveyor belt is characterized in that the lateral elements (3) are connected in pairs to only two rods (4), which are fixedly connected to said lateral elements (3) and form, with these, a link means (2), and adjoining link means (2) are articulated to each other by a coupling element (5) arranged therebetween and connected to neighboring rods (4) of the adjoining link means (2).

20 Claims, 8 Drawing Sheets

CONVEYOR BELT

FIELD OF THE INVENTION

The present invention relates generally to conveyor belts and more specifically to an endless conveyor belt for an air conditioning plant, in which the conveyor belt extends helically along part of its length, comprising transverse rods and lateral elements.

BACKGROUND ART

Conveyor belts of the type described above are often used in air conditioning plants for e.g. quick-freezing of food products.

Such conveyor belts are usually made up of link means which comprise lateral elements and transverse rods connected thereto. The link means are interconnected in such a manner that the conveyor belt is turnable vertically and laterally.

The link means of the conveyor belt may, however, be designed in various ways.

Figure 1A:
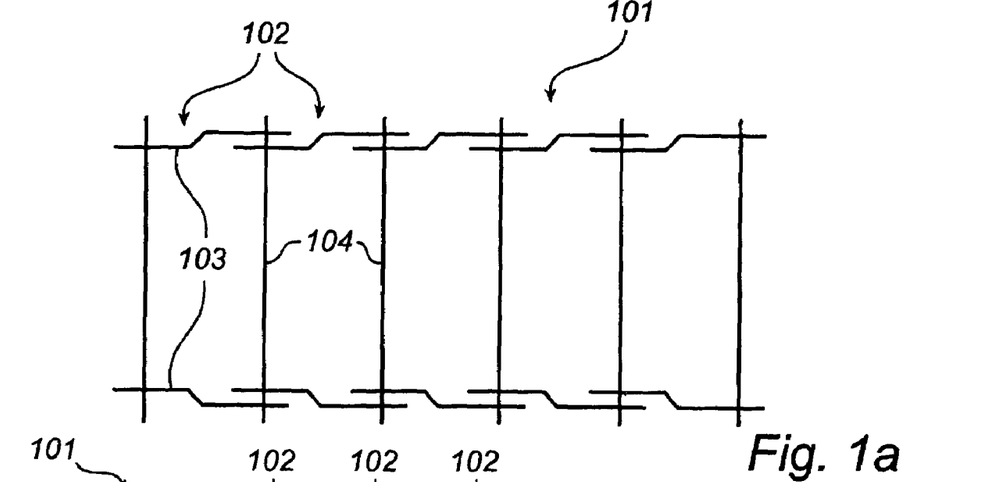
FIGS. 1a–c are schematic views of a conventional conveyor belt with link means of a first type.
Figures 1B, 1C:
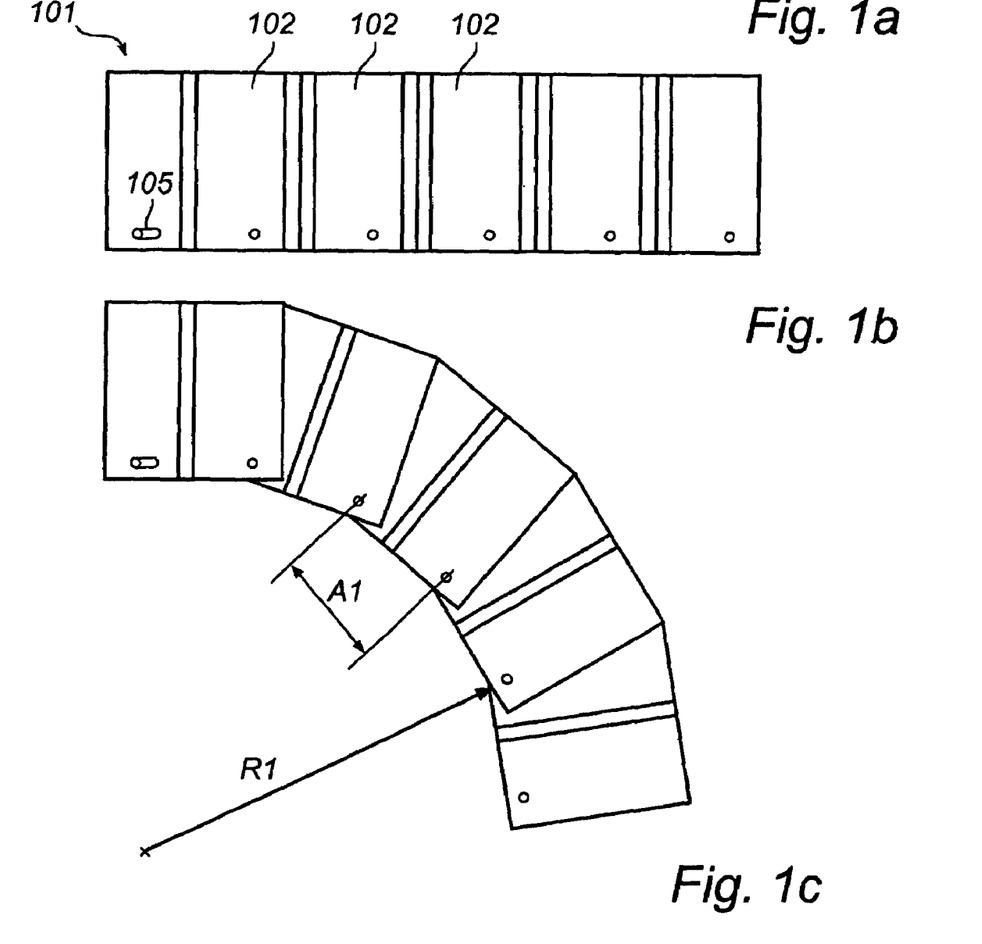

FIGS. 1a–c show a conveyor belt 101 with link means 102 of a first type. Each link means 102 comprises two lateral elements 103 and a rod 104 extended between and fixedly connected to the lateral elements 103.

Elongate holes 105 are formed in the lateral elements 103 to interconnect the link means 102, the rod 104 of a link means 102 extending through the elongate holes 105 in the lateral elements 103 of an adjoining link means 102.

The elongate holes 105 cause adjoining link means 102 to be movable relative to each other. Owing to this movability, the conveyor belt 101 can also be turned in the lateral direction.

The rods 104 are turnably mounted in the elongate holes 105, thus allowing the conveyor belt 101 to turn in the vertical direction.

In vertical turning, which is illustrated in FIG. 1c, the conveyor belt 101 is rigid over two rods 104, which means that the turning radius R1 is dependent on a distance A1 corresponding to the distance between two rods 104.

A conveyor belt constructed according to this principle is described, for instance, in EP 293 095.

This prior-art type of conveyor belt 101, however, suffers from a serious drawback. The link means 102 of the conveyor belt 101 exhibit relatively low rigidity, which means that its load-bearing capacity is limited.

Figure 2A:
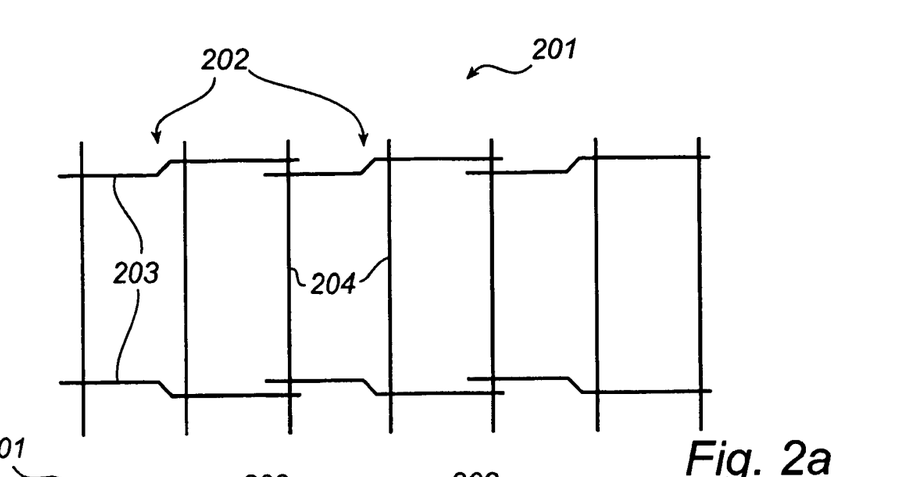
FIGS. 2a–c are schematic views of a conventional conveyor belt with links means of a second type.
Figure 2B:
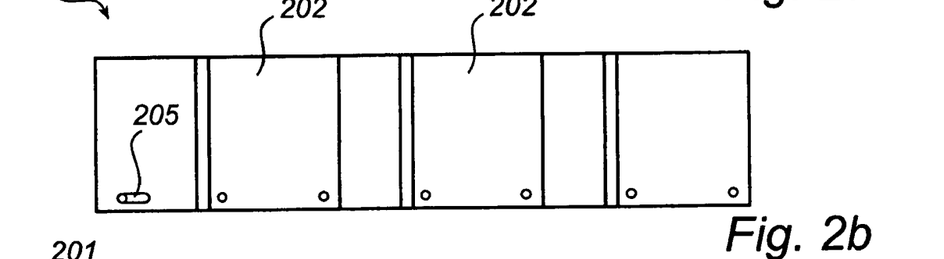
Figure 2C:
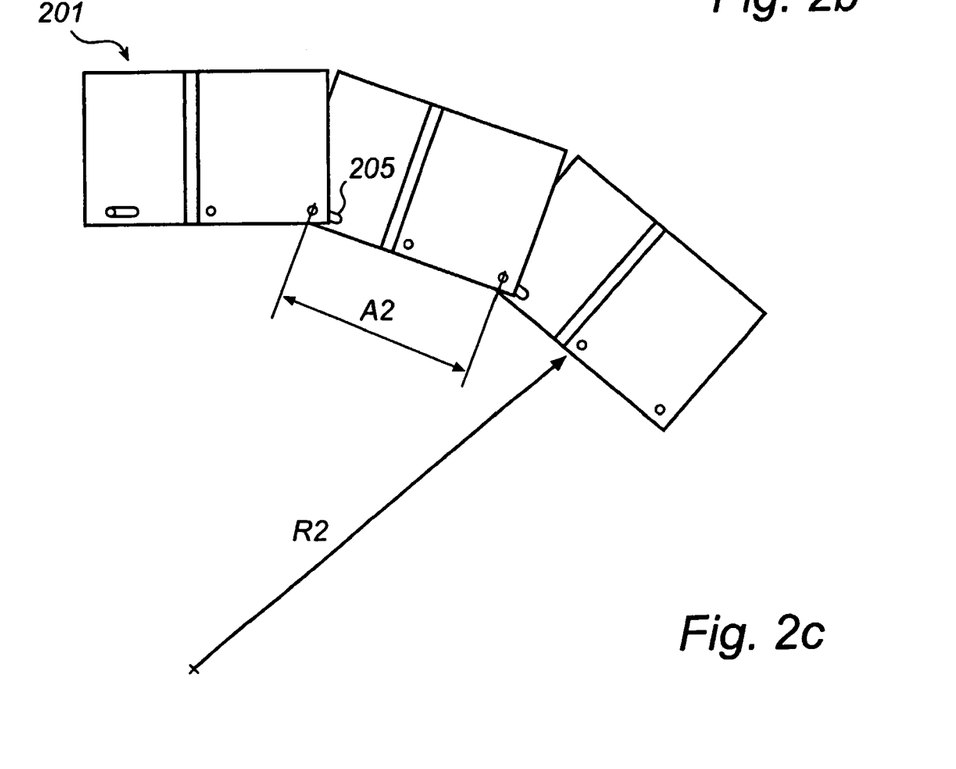

This drawback has been eliminated by means of a conveyor belt 201 as shown in FIGS. 2a–c. The conveyor belt 201 comprises link means 202 of a second type.

This second type of link means 202 comprises lateral elements 203 which are fixedly connected in pairs to two rods 204.

The lateral elements 203 and the rods 204 form a link means 202 with a torsionally relatively rigid frame structure. The link means 202 are in turn interconnected in a manner similar to what has been described above for a conveyor belt 101 with link means 102 of said first type.

A conveyor belt constructed according to this principle is described, for example, in SE 452 590.

In some cases, it is desirable to provide an even stronger connection between the link means 202. It is then also known to connect the link means 202 by means of pull elements (not shown) which are connected with the opposing rods of two adjoining link means 202.

The torsionally relatively rigid link means 202 of said second type imply that the conveyor belt 201 will have a good load-bearing capacity. In some cases, however, the design of the link means causes difficulties.

The design of the link means 202 results in the fact that the conveyor belt 201 when turning in the vertical direction, which is shown in FIG. 2c, becomes rigid over a distance A2 corresponding to three rods 204, and consequently the turning radius R2 of the conveyor belt 201 increases if the distance between the rods 202 is unchanged in relation to a conveyor belt 101 comprising link means 102 of said first type. To retain a given turning radius, which is frequently desirable, the distance between the rods 204 must thus be reduced, which results in a more compact and heavy conveyor belt 201.

Consequently there is a need for an improved conveyor belt with link means of said second type, i.e. a conveyor belt with torsionally rigid link means.

SUMMARY OF THE INVENTION

In view of what has been said above, a first object of the present invention is to provide an improved conveyor belt with torsionally rigid link means.

A further object is to provide such a conveyor belt which exhibits good turnability in the vertical direction.

It is also an object to provide a conveyor belt having relatively low weight.

To achieve at least some of the above objects and also other objects that will be evident from the following description, a conveyor belt is provided according to the present invention having the features as defined in claim 1. Preferred embodiments are stated in the subclaims 2–14.

More specifically, according to the present invention an endless conveyor belt for an air conditioning plant is provided, in which the conveyor belt extends helically along part of its length, comprising transverse rods and lateral elements, said conveyor belt being characterised in that the lateral elements are connected in pairs to only two rods, which are fixedly connected to said lateral elements and form, with these, a link means, and adjoining link means are articulated to each other by a coupling element which is arranged therebetween and connected to neighbouring rods of the adjoining link means.

This results in an improved conveyor belt.

Since each link means comprises two lateral elements and two transverse rods fixedly connected thereto, the link means can be given a relatively rigid frame structure, thereby giving the conveyor belt a good load-bearing capacity.

Each lateral element is further connected to only two rods, i.e. the rods to which the lateral element is fixedly connected. The connection of adjoining link means is achieved indirectly by means of the coupling element. As a result, the conveyor belt can be made to exhibit good turnability in the vertical direction. The indirect connection of the adjoining link means in fact means that the conveyor belt, when turning in the vertical direction, is rigid over two neighbouring rods only, in contrast to prior-art conveyor belts with rigid link means, which conveyor belts are rigid over three rods when turning in the vertical direction. The inventive conveyor belt can thus be made to exhibit a given turning radius with a comparatively smaller number of rods per unit of length, two instead of three, which allows a significant reduction of the weight of the conveyor belt. It will also be possible to increase the dimensions of the conveyor belt without its weight being unreasonably great.

According to a preferred embodiment of the inventive conveyor belt, each of the adjoining link means is articulated to the coupling element arranged therebetween, for turning about two mutually perpendicular axes which are perpendicular to the longitudinal direction of the conveyor belt. This means that a thus designed conveyor belt is turnable both in the vertical and in the lateral direction.

According to another preferred embodiment, adjoining link means are, by means of said coupling element, mutually movable in the longitudinal direction of the conveyor belt. As a result, the conveyor belt can be extended or expanded as well as brought together or collapsed. By collapsing the conveyor belt along its one edge portion and/or expanding the conveyor belt along its other edge portion, it will also be possible to achieve said turnability in the lateral direction of the conveyor belt. The coupling element is preferably designed so that the neighbouring rods of the adjoining link means, in an expanded state, are arranged at a distance from each other that corresponds to the distance between the two rods of the respective link means. By ensuring that the distance between all the rods of the conveyor belt is identical in the expanded state of the belt, it will be easy to pass the conveyor belt over a deflecting roller to be turned in the vertical direction.

According to one more preferred embodiment, the lateral elements of each link means overlap the lateral elements of an adjoining link means in an expanded state of the conveyor belt. This makes it possible to ensure that the conveyor belt has unbroken lateral edges also when it is extended or expanded. Each link means advantageously has a front portion which is complementarily formed to a rear portion of an adjoining link means to allow mutually overlapping bringing together of the link means. The lateral elements of each link means can have a centrally extended transition to form said front portion and said rear portion of the link means. Advantageously, the rods of each link means connect to the respective lateral elements on the associated side of said transition. A thus designed link means can be made to have advantageously great torsional rigidity.

According to yet another preferred embodiment, elongate holes are formed in the coupling element to receive said neighbouring rods of the adjoining link means. The elongate holes enable said movability of the link means in the longitudinal direction of the conveyor belt and also the turnability of the conveyor belt in the lateral direction.

According to another preferred embodiment, the coupling element comprises two coupling means which are each arranged at a respective longitudinal lateral edge of the conveyor belt.

According to another preferred embodiment, a first lateral element of each link means forms a spacer for supporting a superposed turn of the conveyor belt when extending helically in said air conditioning plant. A thus designed conveyor belt is self-supporting on one side. Preferably also a second lateral element of each link means forms a spacer. Such a conveyor belt will be self-supporting on both sides.

According to yet another preferred embodiment, the rods of the conveyor belt support a wire mesh for forming a load-carrying surface of the conveyor belt.

Preferred embodiments of the present invention will now be described by way of example and with reference to the accompanying drawings.

DESCRIPTION OF EMBODIMENTS

Figure 3:
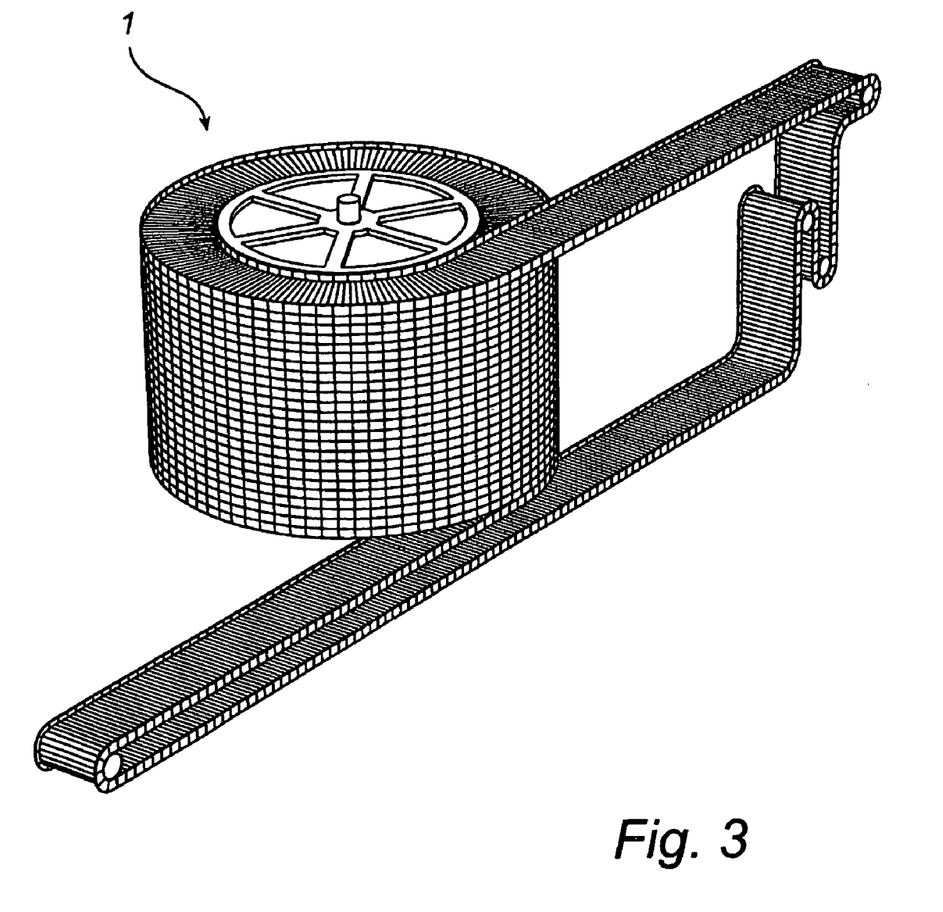
FIG. 3 is a perspective view of an inventive endless conveyor belt which extends helically along part of its length.

The present invention relates to an endless conveyor belt 1 for an air conditioning plant, in which the conveyor belt 1 extends helically along part of its length. The conveyor belt 1 thus is intended to be arranged in an endless loop, for instance, as shown in FIG. 3. The conveyor belt 1 can be intended for conveying of foodstuffs, which will be quick-frozen when conveyed through the air conditioning plant.

However, it will be appreciated that the inventive conveyor belt can also be used for other applications than air conditioning plants.

The present invention will now be described with reference to a schematic, basic embodiment and to preferred embodiments. Equivalent components have been given the same reference numerals.

Figure 4A:
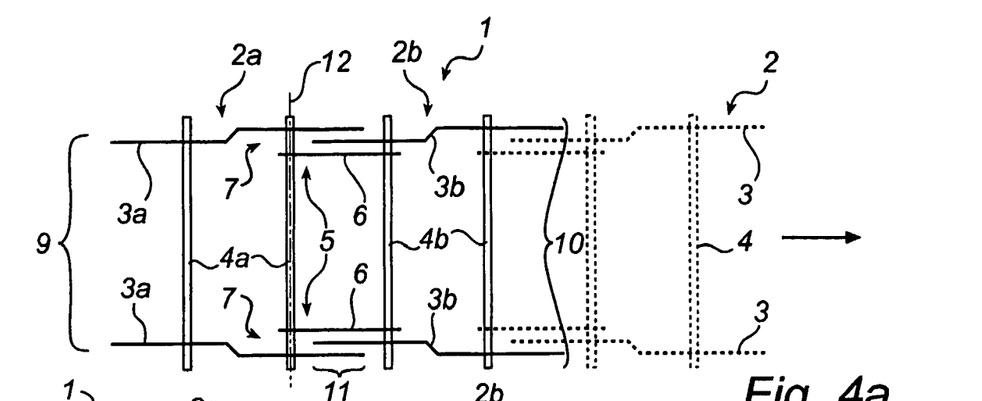
FIGS. 4a–c are schematic views of an inventive conveyor belt with link means of a second type.
Figure 4B:
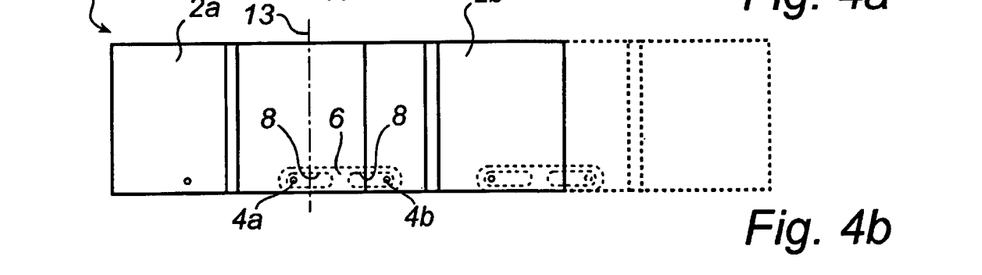
Figure 4C:
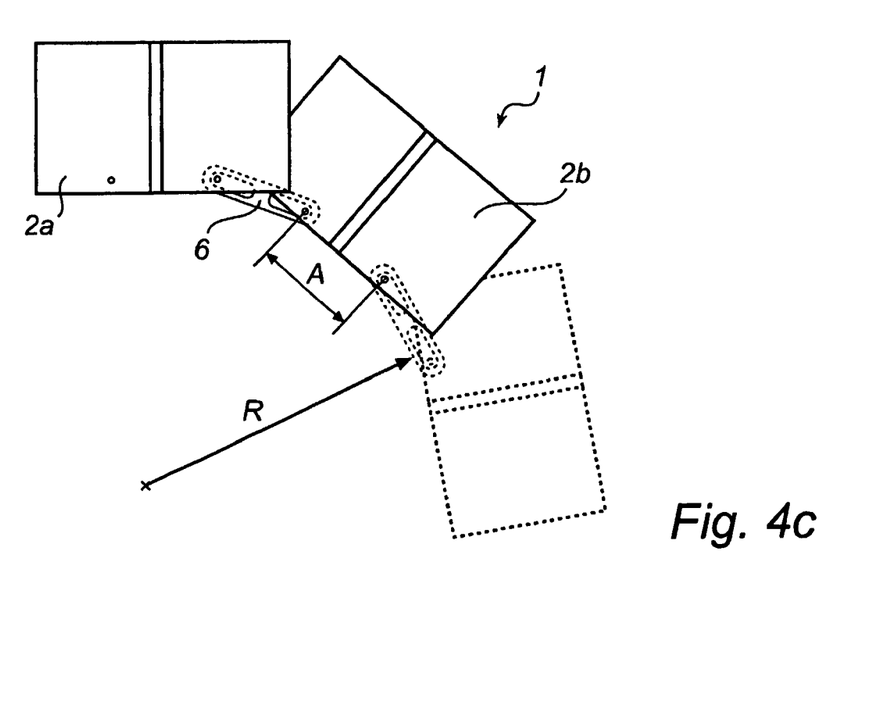

FIGS. 4a–c, to which reference is now made, schematically illustrate an inventive conveyor belt 1.

The conveyor belt 1 comprises a plurality of link means 2, which each have two lateral elements 3 and two rods 4 extended between and fixedly connected to the lateral elements.

The shown part of the conveyor belt 1 comprises more specifically a first 2a and a second 2b mutually adjoining link means, which are indirectly articulated to each other by means of a coupling element 5. One more link means 2 adjoining said second link means 2b is indicated by dashed lines.

Each link means 2a, 2b comprises two lateral elements 3a, 3b and two transverse rods 4a, 4b extended between and fixedly connected to the lateral elements 3a, 3b.

Each link means 2a, 2b thus has a frame structure which imparts high torsional rigidity to the link means 2a, 2b.

There is no direct connection between the first 2a and the second 2b link means, but the articulation is achieved indirectly by means of the coupling element 5 arranged therebetween and connected to two neighbouring rods 4a and 4b, i.e. to the rods opposing each other, of the adjoining link means 2a, 2b.

In the shown embodiment, the coupling element 5 comprises two coupling means 6 which are each arranged at a respective longitudinal lateral edge 7 of the conveyor belt 1.

Each coupling means 6 consists of an elongate body, in which two successively arranged elongate holes 8 are formed.

Each elongate hole 8 receives one of the two neighbouring rods 4a, 4b of the adjoining link means 2a, 2b.

The elongate holes 8 of the coupling means 6 cause the adjoining link means 2a, 2b to be mutually movable in the longitudinal direction of the conveyor belt 1.

As shown in FIG. 4a, the first link means 2a has a rear portion 9 which is complementarily formed to a front portion 10 of the adjoining second link means 2b to provide an overlap 11 between the link means 2a and 2b. The overlap 11 is preferably formed so that it is also maintained when the link means 2a, 2b are maximally moved away from each other. In the embodiment shown in FIG. 4a, the comparatively wider front portion of the first link means 2a grasps the narrower rear portion of the second link means 2b, the direction of travel of the conveyor belt being illustrated by the arrow shown in FIG. 4a.

The inventive conveyor belt 1 can thus be brought together or collapsed by bringing its link means 2a, 2b together. The conveyor belt 1 can also be extended or expanded by moving the link means 2a, 2b away from each other. The overlap 11 between the link means 2a, 2b, which is maintained in the expanded state of the conveyor belt 1, ensures that the conveyor belt 1 has unbroken lateral edges 7 also when the conveyor belt 1 is expanded.

The coupling element 5 arranged between the adjoining link means 2a, 2b results in the link means 2a, 2b being turnable relative to each other.

More specifically, the link means 2a, 2b are articulated to the coupling element 5 arranged therebetween for turning on the one hand about a first axis of rotation extended parallel to the transverse direction of the conveyor belt 1 and illustrated at 12 in FIG. 4a and, on the other hand, about a second axis of rotation extended perpendicular both to said transverse direction and to the longitudinal direction of the conveyor belt 1, said second axis being shown at 13 in FIG. 4b.

The capability of turning about the first axis of rotation 12 is allowed by the rods 4a, 4b of the link means 2a, 2b being turnably received in the elongate holes 8 of the coupling means 6.

The capability of turning about the second axis of rotation 13 is allowed by the rods 4a, 4b being movable in said elongate holes 8.

The inventive conveyor belt 1 is thus turnable both vertically and laterally owing to the turnability of its link means 2a, 2b.

For turning the conveyor belt 1 in the lateral direction, the conveyor belt 1 can, for instance, be expanded along one lateral edge 7 and/or collapsed along the other lateral edge 7.

The inventive conveyor belt 1 actually has extremely good turnability in the vertical direction. The reason for this is that the first link means 2a is vertically turnably connected to the coupling element 5, which in turn is vertically turnably connected to the adjoining second link means 2b. This means, when turning in the vertical direction, that the inventive conveyor belt 1, which thus comprises a plurality of thus articulated and indirectly connected link means 2, is rigid only over a distance A corresponding to two neighbouring transverse rods 4. This should be compared with conventional conveyor belts 201 which comprise rigid link means 202 and which, when turning in the lateral direction, are rigid over a distance corresponding to three rods 204.

The good turnability of the inventive conveyor belt 1 in the vertical direction ensures a number of advantages.

In particular, a given turning radius R can be provided for a conveyor belt 1 of a certain size with a comparatively smaller number of rods 4 per unit of length. This means that the weight of the conveyor belt 1 is reduced, which is a great advantage especially in conveyor belts 1 with relatively large dimensions.

Figure 5:
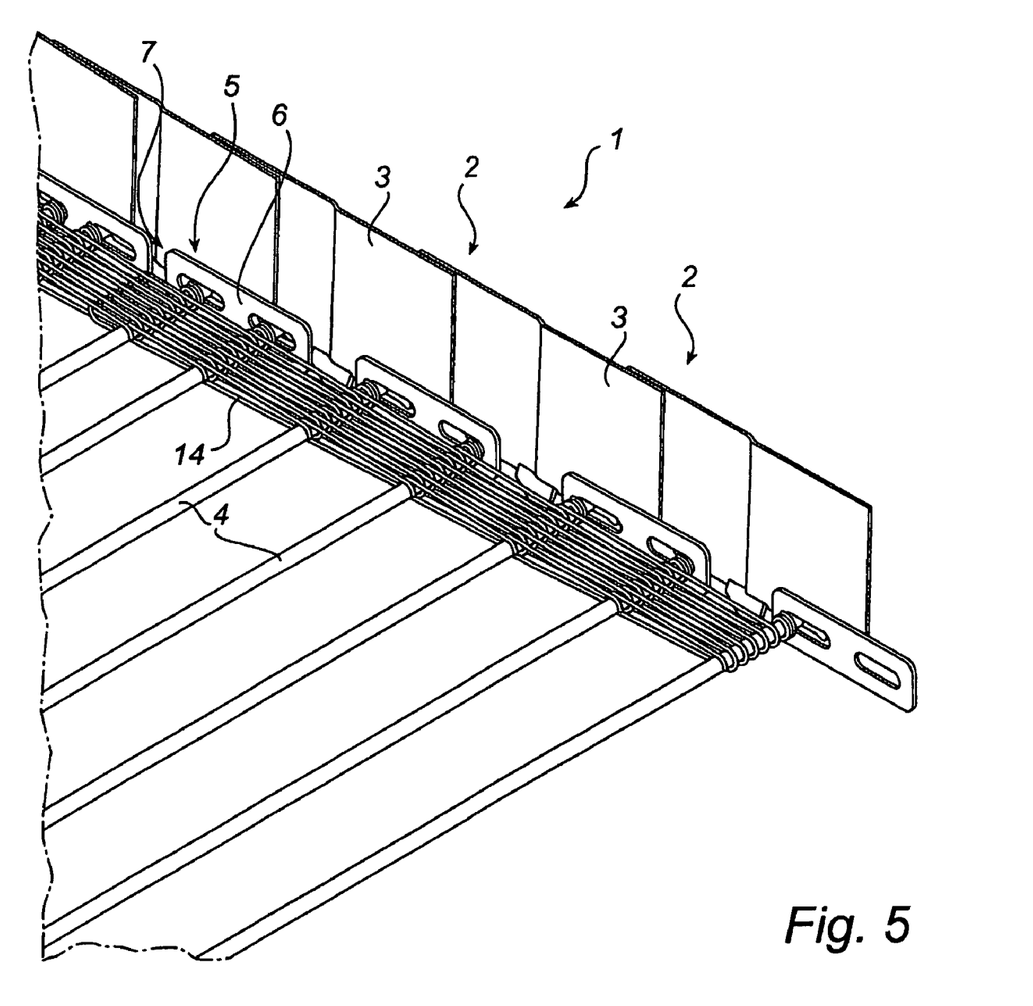
FIG. 5 is a broken-away perspective view of a preferred embodiment of an inventive conveyor belt.

FIG. 5, to which reference is now made, illustrates a broken-away part of a conveyor belt 1 according to a preferred embodiment of the invention.

As described above, the conveyor belt 1 comprises a plurality of articulated and indirectly connected link means 2, which each comprise two lateral elements 3 and two transverse rods 4 which extend between and are fixedly connected to the lateral elements 3.

In the shown embodiment, the indirect connection between two adjoining link means 2 is achieved by means of a coupling element 5 in the form of two coupling means 6 which are each arranged along a respective lateral edge 7.

Figure 6:
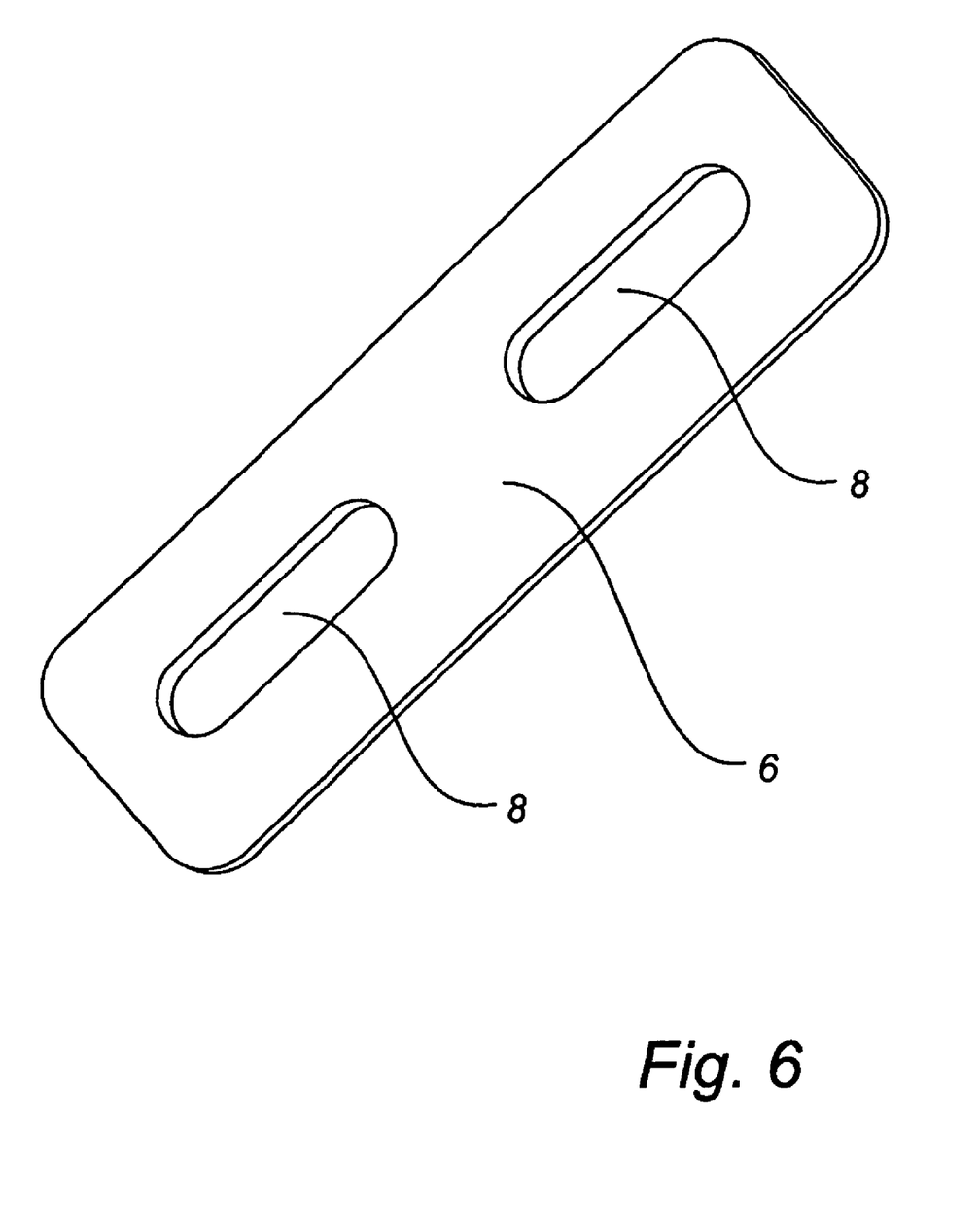
FIG. 6 is a perspective view of a connecting means of the conveyor belt in FIG. 5.

Each coupling means 6 consists of an elongate body, in which two successively arranged elongate holes 8 are formed, which is shown more clearly in FIG. 6.

The rods 4 of the link means 2 further support a wire mesh 14 forming a load-carrying surface of the conveyor belt 1. This wire mesh, which is only partly shown in FIG. 5, is preferably formed so that it acts to position said coupling means 6 along the respective lateral edges 7 of the conveyor belt 1.

The distance between the rods 4 of the conveyor belt 1 is in the expanded state of the conveyor belt preferably identical to the distance between the rods 4 of the respective link means 2. However, it will be appreciated that the present invention also comprises conveyor belts with rods which are arranged in a different spaced-apart relationship. The identical distance between the rods in the expanded state of the conveyor belt is, however, advantageous for passing the conveyor belt over a deflecting roller for deflecting the conveyor belt in the vertical direction.

Figure 7:
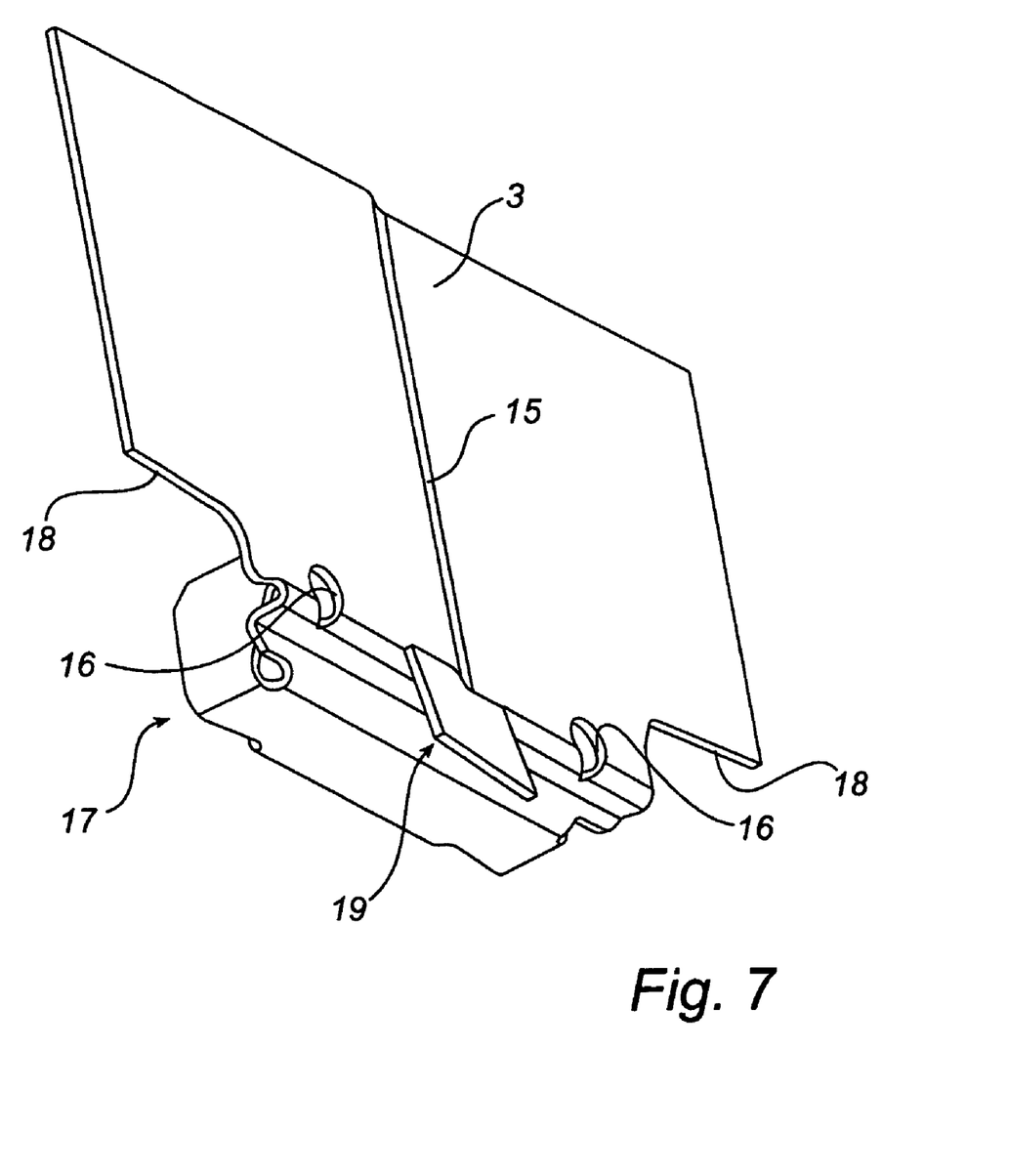
FIG. 7 is a perspective view of a lateral element of the conveyor belt in FIG. 5.

FIG. 7 illustrates more clearly the lateral element 3 of the inventive conveyor belt 1. More specifically, the lateral element 3 consists of a metal sheet with an essentially centrally extended fold line or shoulder 15. A hole 16 is formed on each side of said shoulder 15 for receiving a rod 4 each. On the rear side of the lateral element 3, a box-like structure 17 is formed integrally with said metal sheet to allow reliable welding of said rods 4 to the lateral element 3.

The lower corner portions 18 of the lateral element 3 are designed to allow two adjoining link means 2 to be brought together, without the lateral elements 3 striking against each other or adjoining rods 2.

The central shoulder 15 of the lateral element 3 results in the link means 2 obtaining a front portion 10 and a rear portion 9 in accordance with that described with reference to FIG. 4a. The rear portion 9 of a link means 2 is complementarily formed to the front portion 10 of an adjoining link means 2 to allow bringing together of the link means 2.

The fact that the rods 4 connect to the respective lateral elements 3 on the associated side of said central shoulder 15 contributes to improving the torsional rigidity of the link means 2.

The lateral elements 3 also form spacers for supporting a superposed turn of the conveyor belt 1 when extending helically. The lateral element 3 shown in FIG. 7 has on its underside guide means 19 which prevent a superposed turn from sliding off a subjacent turn. A conveyor belt 1 comprising link means 2 with lateral elements 3 according to FIG. 7 is thus self-supporting. However, it will be appreciated that the present invention also comprises non-self-supporting conveyor belts as well as conveyor belts which are self-supporting along one lateral edge only.

According to the present invention, an endless conveyor belt 1 for an air conditioning plant is thus provided, in which the conveyor belt 1 extends helically along part of its length. The conveyor belt 1 comprises a plurality of articulated and indirectly connected link means 2 which each comprise two lateral elements 3 and two transverse rods 4 extended between and fixedly connected to the lateral elements 3. The articulated and indirect connection between two adjoining link means 2 is achieved by means of a coupling element 5 which is connected to neighbouring rods 4 of the link means 2. In other words the coupling element 5 is connected to the two rods 4 of the adjoining link means 2, which rods 4 are oriented towards each other.

The coupling element 5 is designed so as to allow turning of two adjoining link means 2 relative to each other about two mutually perpendicular axes of rotation 12, 13 which are perpendicular to the longitudinal direction of the conveyor belt 1. Consequently, the conveyor belt 1 is turnable both vertically and laterally.

According to a preferred embodiment, the turnability of the link means 2 is achieved by means of a coupling element 5 in the form of two coupling means 6 which are arranged each at a lateral edge 7 of the conveyor belt 1. Each coupling means 6 has elongate holes 8 which turnably receives said neighbouring rods 4.

Figure 8:
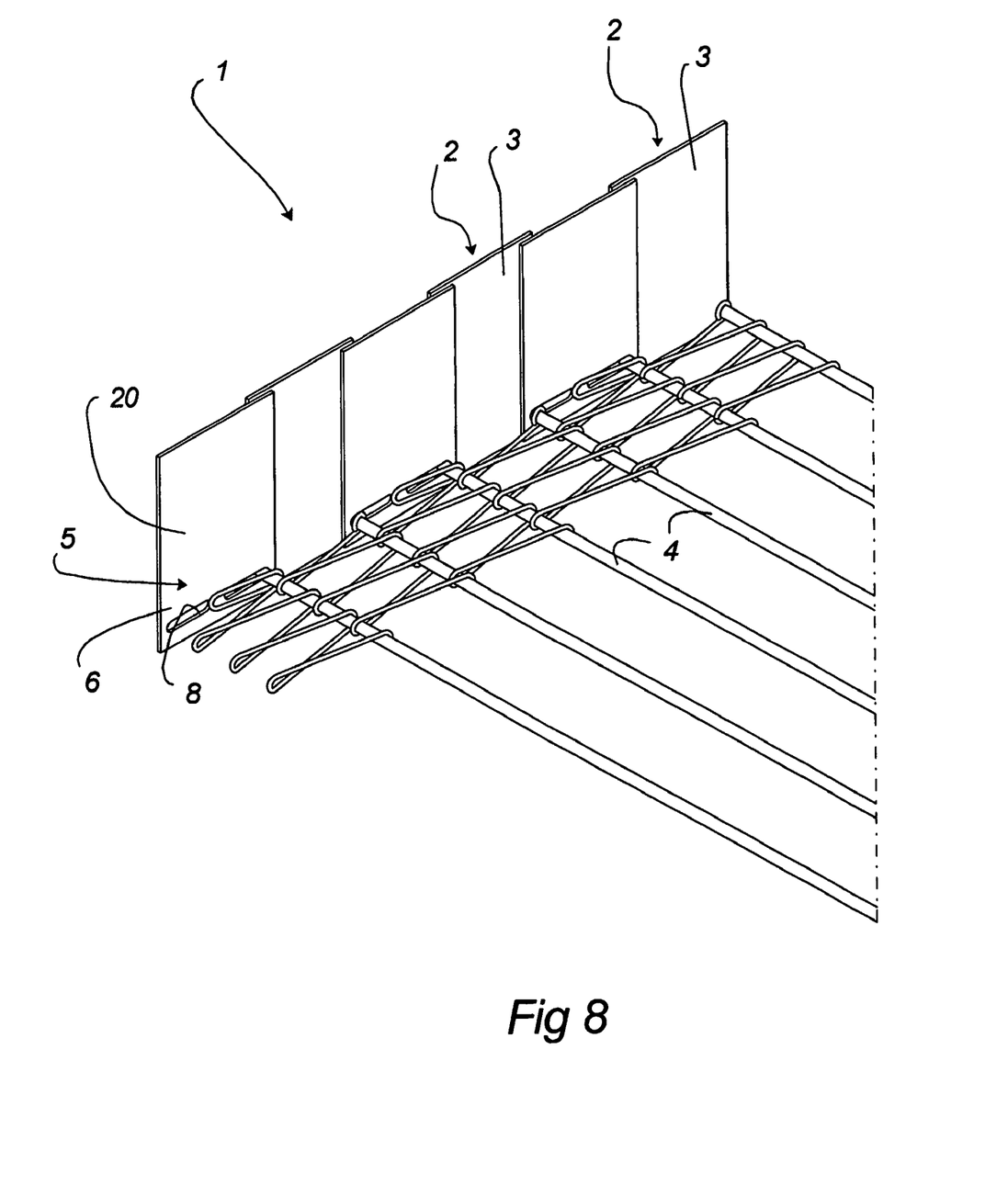
FIG. 8 is a broken-away perspective view of a second embodiment of an inventive conveyor belt.

FIG. 8, to which reference is now made, illustrates one more embodiment of an inventive conveyor belt 1.

Like in the previously described embodiment, the conveyor belt 1 comprises a plurality of link means 2, which each have two lateral elements 3 (of which only one is shown) and two rods 4 extended between and fixedly connected to the lateral elements 3. Adjoining link means 2 are further interconnected by means of a coupling element 5 in the form of two coupling means 6, which are arranged at a respective lateral edge of the conveyor belt 1. In each coupling means 6, two successively arranged elongate holes 8 are formed, which each receive one of the two neighbouring rods 4 of the adjoining link means 2.

Owing to the elongate holes 8 of the coupling means 6, the adjoining link means 2 are movable relative to each other in the longitudinal direction of the conveyor belt 1.

Each link means 2 has a front portion which is identical to a rear portion. This means that two adjoining link means 2 cannot be brought together with an overlap. More specifically, a gap is formed between two adjoining link means 2 when being moved away from each other.

However, it is desirable for the conveyor belt 1 to have essentially unbroken lateral edges. For this reason each coupling means 6 comprises a projecting flange 20 which fills up the gap formed between the two adjoining link means 2.

The coupling element can also be designed in other ways. For instance, according to an embodiment that is not shown, it is possible to indirectly connect two adjoining link means by a coupling element formed in one piece and arranged between the lateral edges of the conveyor belt. The coupling element can have two successively arranged elongate holes, which each receive one of the two neighbouring rods of the adjoining link means. By providing the coupling element with a projecting flange, this, combined with succeeding projecting flanges of coupling elements of the same type, can be made to act to divide the load-carrying surface of the conveyor belt into separate paths, thereby allowing separation of products on the conveyor belt.

It will be appreciated that the present invention is not limited to the embodiments illustrated and described above.

It thus possible to let the coupling element be formed of parts of the wire mesh forming the load-carrying surface of the conveyor belt. The coupling element which indirectly connects two adjoining link means will then consist of the wires that connect two neighbouring rods of the adjoining link means.

It is also possible to design the lateral elements in a such manner that they do not form spacers for supporting a superposed turn. It is also possible to let the lateral elements form spacers along only one of the two edge portions of the conveyor belt. Such a conveyor belt would thus be self-supporting only on one side.

The lateral elements can also be designed in other ways, and moreover the coupling element need not be designed in accordance with the embodiments illustrated. A coupling means of the coupling element may, for instance, have a single elongate hole which receives both neighbouring rods of the adjoining link means.

Several modifications and variations are thus feasible, and therefore the scope of the present invention is exclusively defined by the appended claims.

The invention claimed is:

1. An endless conveyor belt extending helically along part of its length, comprising:
    leading transverse rods and trailing transverse rods; and
    lateral elements;
    wherein the lateral elements are connected in pairs to only two rods, a leading transverse rod and a trailing transverse rod, said leading and trailing rods being fixedly connected to said lateral elements and form, with these, a link structure having a torsionally rigid frame structure; and
    adjoining first and second link structures are articulated to each other by a coupling element which is arranged there-between and turnably connected to a trailing rod of a first link structure and to a leading rod of an adjoining second link structure.

2. A conveyor belt as claimed in claim 1, in which each of the adjoining link structures is articulated to the coupling element arranged therebetween, for turning about two mutually perpendicular axes which are perpendicular to the longitudinal direction of the conveyor belt.

3. A conveyor belt as claimed in claim 2, in which adjoining link structures are, by means of said coupling elements, mutually movable in the longitudinal direction of the conveyor belt.

4. A conveyor belt as claimed in claim 3, in which the coupling element is designed so that the neighboring rods of the adjoining link structures, in an expanded state, are arranged at a distance from each other that corresponds to the distance between the two leading and trailing rods of the respective link structures.

5. A conveyor belt as claimed in claim 4, in which the lateral elements of each link structure overlap the lateral elements of an adjoining link structure in an expanded state of the conveyor belt.

6. A conveyor belt as claimed in claim 5, in which each link structure has a leading portion which is complementarily formed to a trailing portion of an adjoining link structure to allow mutually overlapping bringing together of the link structures.

7. A conveyor belt as claimed in claim 3, in which the lateral elements of each link structure overlap the lateral elements of an adjoining link structure in an expanded state of the conveyor belt.

8. A conveyor belt as claimed in claim 7, in which each link structure has a leading portion which is complementarily formed to a trailing portion of an adjoining link structure to allow mutually overlapping bringing together of the link structures.

9. A conveyor belt as claimed in claim 1, in which adjoining link structures are, by means of said coupling elements, mutually movable in the longitudinal direction of the conveyor belt.

10. A conveyor belt as claimed in claim 9, in which the coupling element is designed so that the neighboring rods of the adjoining link structures, in an expanded state, are arranged at a distance from each other that corresponds to the distance between the two leading and trailing rods of the respective link structures.

11. A conveyor belt as claimed in claim 9, in which the lateral elements of each link structure overlap the lateral elements of an adjoining link structure in an expanded state of the conveyor belt.

12. A conveyor belt as claimed in claim 11, in which each link structure has a leading portion which is complementarily formed to a trailing portion of an adjoining link structure to allow mutually overlapping bringing together of the link structures.

13. A conveyor belt as claimed in claim 11, in which the lateral elements of each link structure have a centrally extended shoulder to form a leading portion and a trailing portion of the link structure.

14. A conveyor belt as claimed in claim 13, in which the leading and trailing rods of each link structure connect to the respective lateral elements on the associated side of said shoulder.

15. A conveyor belt as claimed in claim 1, in which elongate holes are formed in the coupling element to receive said neighboring rods of the adjoining link structures.

16. A conveyor belt as claimed in claim 1, in which the rods of the conveyor belt support a wire mesh for forming a load-carrying surface of the conveyor belt.

17. An endless conveyor belt extending helically along part of its length, comprising:
    transverse rods;
    lateral elements,
    wherein the lateral elements are connected in pairs to only two rods, which are fixedly connected to said lateral elements and form, with these, a link structure,
    adjoining link structures are articulated to each other by a coupling element which is arranged there-between and connected to neighboring rods of the adjoining link structures, and
    in which adjoining link structures are capable of being brought together without overlap, and the coupling element which connects said links to each other comprises two coupling subelements which are each arranged at a respective longitudinal lateral edge of the conveyor belt, each coupling subelement having a protruding flange which fills up a gap between the respective lateral elements of the adjoining link structure when being moved away from each other.

18. An endless conveyor belt extending helically along part of its length, comprising:
    transverse rods;
    lateral elements,
    wherein the lateral elements are connected in pairs to only two rods, which are fixedly connected to said lateral elements and form, with these, a link means,
    adjoining link means are articulated to each other by a coupling element which is arranged there-between and connected to neighboring rods of the adjoining link means, and
    in which the coupling element comprises two coupling subelements which are each arranged at a respective longitudinal lateral edge of the conveyor belt.

19. An endless conveyor belt extending helically along part of its length, comprising:
    transverse rods;
    lateral elements,
    wherein the lateral elements are connected in pairs to only two rods, which are fixedly connected to said lateral elements and form, with these, a link structure,
    adjoining link structures are articulated to each other by a coupling element which is arranged there-between and connected to neighboring rods of the adjoining link structures, and
    in which a first lateral element of each link structure forms a spacer for supporting a superposed turn of the conveyor belt when extending helically.

20. A conveyor belt as claimed in claim 10, in which also a second lateral element of each link structure forms a spacer.

* * * * *